Patented Jan. 11, 1944

2,339,003

UNITED STATES PATENT OFFICE 2,339,003

METHOD OF MAKING THIN-WALL INSULATORS

Jan Hendrik de Boer, Evert Johannes Willem Verwey, and Marinus Gerard van Bruggen, Eindhoven, Netherlands, assignors, by mesne assignments, to Hartford National Bank and Trust Company, Hartford, Conn., as trustee No Drawing. Application November 7, 1939, Serial No. 303,310. In Germany November 7, 1938

3 Claims. (Cl. 25—156)

This invention relates to the manufacture of thin-walled electrical insulators whose wall preferably has a thickness of less than 500 $\mu$ and which consist of refractory vitreous or ceramic materials.

According to the invention the material required for this purpose is applied in a finely divided state to a core consisting substantially of carbon or organic substance and then heated so as to obtain sufficient coherence and preferably at the same time any further desired properties, whereupon the core is removed by heating in an oxidising manner.

Application of the material to the core may be affected by dipping the core in or spraying the same with the coating material held in a suitable suspension to which, there may be added a binding agent which is burnt away by heating in the air.

When the core consists of an electrically conductive carbon containing material or is furnished with a conductive carbon layer at its surface the material may often be applied with advantage by electrophoresis.

After the core has been removed by heating in an oxidising manner the insulators formed may, if desired, still be subjected to after-heating for acting upon the mechanical and electrical properties of the insulator, however, the first heating operation occurs at any rate in such manner that the insulator to be formed has acquired at least such a great mechanical strength that the core can be readily removed.

Carbon and organic substances when used as core material, have the advantage that they do not chemically react with many of the refractory materials with which the invention is particularly concerned and, moreover, that the vapour tension thereof is very low when the heating operation, for ensuring the necessary mechanical strength, is effected in a vacuum or in a reducing or inert atmosphere, and furthermore, such materials can be very easily eliminated by heating in an oxidising manner.

If there is a risk of the production of cracks due to shrinking of the layer applied to the core the atmosphere wherein the heating in an oxidising manner occurs may be so chosen that the core decreases in size in step with the shrinkage of the insulator to be manufactured. Furthermore, the reaction heat released upon combustion of the core, may be utilised for the sintering operation.

The method according to the invention has the advantage that thin-walled insulators consisting of ceramic or refractory vitreous or ceramic materials can be manufactured, for instance, with a thickness of the wall even down to 50 $\mu$ and less, and in addition that the shape may be such that they cannot be manufactured or only with very great difficulties by means of the usual ceramic moulding and casting methods or the methods usually applied in the glass industry.

The insulators according to the invention may be used in the manufacture of small electric condensers having a high capacity and, moreover, a high breakdown voltage and low di-electric losses. To this end use may, for instance, be made of glasses, porcelains or the like having suitable dielectric properties in relation to their high dielectric constant more particularly titanium dioxide and mixtures containing titanium dioxide. For instance, a compactly sintered titanium dioxide tube according to the invention having a wall thickness of about 50 $\mu$ permits the production of a condenser having a capacity of about 1500 $\mu\mu$ F. per cm.$^2$ by internal and external metallisation according to the method commonly used in the ceramic industry.

Example 1

A thin layer of rutile powder is deposited on a graphite rod by electrophoresis. To this end use is made of a stable suspension of rutile in methyl alcohol. This suspension is obtained by preburning anatase powder at a temperature of about 1350° C. and crushing the rutile lumps obtained in a steel mortar until the whole quantity passes through a sieve having 50 meshes per cm. After rinsing out with water and methyl alcohol and drying in five parts by weight of methyl alcohol the powder is peptised. The rod on which the rutile is deposited by electrophoresis, consists of graphite or retort carbon powder which is pressed to a rod preferably with an inorganic binder such as clay and then sintered in a known manner. To coat the carbon rod with a rutile layer by electrophoresis the rod is immersed into the said suspension for instance for several seconds and a voltage of —50 relative to a nickel counter-electrode is applied thereto. The carbon rod thus coated is heated at about 1000° C. in air, whereby the carbon is oxidised and partly burnt away and, at the same time, the rutile layer is sintered to form a thin-walled tube having sufficient mechanical strength. Thereupon the tubular insulator obtained can be easily removed, after cooling, from the remaining part of the core. By thereafter heating in air at about 1450° C., during which operation the tubes may, for instance, be laid on a plate of magnesium oxide, the tubes are compactly sintered.

Example 2

Porcelain is, in accordance with Example 1, crushed, ground, peptised in methyl alcohol and subsequently applied in the form of a thin layer to a graphite rod by electrophoresis. In a manner similar to that set forth above the graphite core is burnt away whereupon the porcelain is compactly sintered at about 1300° C. in air. Thus tubes can be obtained whose wall has a thickness of 30 $\mu$ and more, if desired.

Example 3

A hard glass species having a softening temperature of about 800° C. and substantially consisting of about 60% $SiO_2$, 20% $Al_2O_3$ and small quantities of MgO, CaO, $B_2O_3$ and $K_2O$, in accordance with Example 1, is crushed, ground and subsequently suspended in an equal quantity by weight of methyl alcohol. A tube made from pressed carbon is externally coated with a thin layer of said glass by dipping in the fairly thick suspension. After drying it is heated at 1000° C. in an inert atmosphere, for instance nitrogen containing less than 1% oxygen, as a result of which there ensues a thoroughly molten glass layer on the carbon core, whereupon the core is eliminated by heating in oxygen at a temperature of 700° C. In this way tubes whose wall has a thickness of about 50 $\mu$ can be easily manufactured.

What we claim is:

1. A method of making a thin-walled condenser dielectric from titanium dioxide material comprising the steps of applying the material in a finely-divided state to a self-sustaining support consisting substantially of carbon to thereby form thereon a thin layer having a thickness less than about 500 microns, heating the coated support in a non-oxidizing atmosphere to sinter the material and make the layer coherent, and thereafter heating the coated support in an oxidizing atmosphere to eliminate the support.

2. A method of making a thin-walled condenser dielectric from titanium dioxide material comprising the steps of applying the material in a finely divided state to a self-sustaining support consisting substantially of carbon to thereby form thereon a thin layer having a thickness less than about 500 microns, heating the coated support in a non-oxidizing atmosphere to make the layer coherent, thereafter heating the coated support in an oxidizing atmosphere to eliminate the support, and subsequently heating the insulator to improve its mechanical and electrical properties.

3. A method of making a thin-walled condenser dielectric from ceramic material comprising the steps of applying the material in a finely-divided state to a self-sustaining support consisting substantially of carbon to thereby form thereon a thin layer having a thickness less than about 500 microns, heating the coated support in a non-oxidizing atmosphere to make the layer self-sustaining while maintaining the support substantially in its initial form, and thereafter heating the coated support in an oxidizing atmosphere to eliminate the support.

JAN HENDRIK DE BOER.
EVERT JOHANNES WILLEM VERWEY.
MARINUS GERARD VAN BRUGGEN.